United States Patent
Wu (10) Patent No.: US 8,275,267 B2
(45) Date of Patent: Sep. 25, 2012

(54) METHOD, SYSTEM, AND APPARATUS FOR FILTER IMPLEMENTATION USING HERMITIAN CONJUGATES

(75) Inventor: Yuejian Wu, Ottawa (CA)

(73) Assignee: Infinera Corporation, Sunnyvale, CA (US)

(*) Notice: Subject to any disclaimer, the term of this patent is extended or adjusted under 35 U.S.C. 154(b) by 306 days.

(21) Appl. No.: 12/785,679

(22) Filed: May 24, 2010

(65) Prior Publication Data

US 2011/0182577 A1    Jul. 28, 2011

Related U.S. Application Data

(60) Provisional application No. 61/297,860, filed on Jan. 25, 2010.

(51) Int. Cl.
H04B 10/12     (2006.01)
H04B 10/00     (2006.01)
H04B 10/06     (2006.01)

(52) U.S. Cl. .................. 398/149; 398/159; 398/208

(58) Field of Classification Search .................. 398/149, 398/158, 147, 192, 208, 202, 52; 375/147, 375/260, 261
See application file for complete search history.

(56) References Cited

U.S. PATENT DOCUMENTS

| 7,130,353 B2 * | 10/2006 | Brunel | 375/261 |
| 7,715,462 B2 * | 5/2010 | Chin et al. | 375/147 |
| 2003/0039302 A1 * | 2/2003 | Castelain et al. | 375/147 |

* cited by examiner

Primary Examiner — Dalzid Singh
(74) Attorney, Agent, or Firm — David L. Soltz (57) ABSTRACT

Filter implementation using Hermitian conjugates and time division multiplexing (TDM) is disclosed to more efficiently compensate for chromatic dispersion of optical signals transmitted over a fiber optic medium. Embodiments for an input, filter, and output sections of a Digital Signal Processor (DSP) are described. The disclosed methods, and corresponding apparatus and systems enables a substantial reduction in the complexity of the hardware needed to implement CD compensation in the DSP. According to another embodiment, Inverse-Fourier transform circuits receive TDM data from the filter section and assemble the TDM data format back to a non-TDM format.

29 Claims, 8 Drawing Sheets

METHOD, SYSTEM, AND APPARATUS FOR FILTER IMPLEMENTATION USING HERMITIAN CONJUGATES

CROSS REFERENCE TO RELATED APPLICATION

This application claims the benefit of U.S. Provisional Application No. 61/297,860, filed Jan. 25, 2010.

FIELD

The present disclosure relates generally to optical communication networks, and in particular to a method, system, and apparatus for filter implementation using Hermitian conjugates.

BACKGROUND

Optical communication systems are known in which optical signals carrying data are transmitted from a first node to a second or receive node over an optical fiber. At the receive node, the optical signals are converted into corresponding electrical signals, which are then further processed.

The optical signals may be subject to chromatic dispersion (CD) in which various frequency components in each signal travel at different velocities. As a result, the in-phase (I) and quadrature (Q) components of electronic signals representative of data carried by the optical signals may have different delay and frequency response characteristics. Such differences may be resolved and CD compensation can be achieved electronically, in part, by converting the electronic signals into the frequency domain and conjugating the resulting frequency domain data in accordance with a Hermetian operation.

Figure 1:
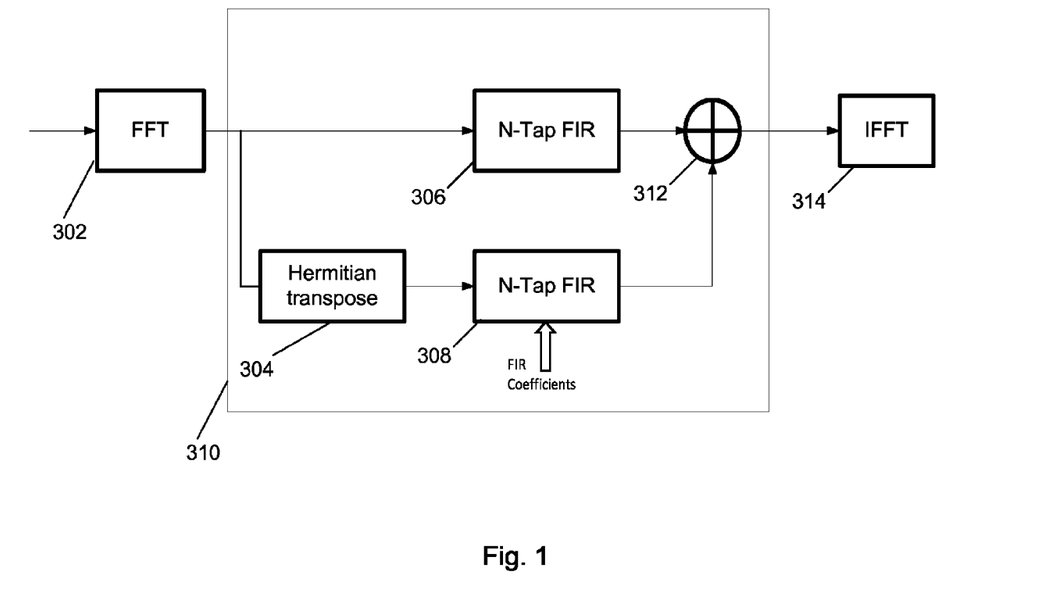
FIG. 1 is a block diagram illustrating a conventional frequency domain chromatic dispersion equalization block between Fast Fourier Transform (FFT) and Inverse Fourier Transform (IFFT) blocks.

FIG. 1 illustrates a conventional circuit 301 that performs electronic CD compensation. Circuit 301 includes FFT block 302, which receives the electronic signals representative of data carried by the optical signal and outputs frequency domain signals. The frequency domain signals are then filtered in block 310, which includes Hermetian transpose circuit 304, N-tap FIR filter 306, and N-tap FIR filter 308. Namely, each output from FFT block 302 is supplied to a corresponding input or tap of filter 306 and multiplied by a corresponding coefficient. The resulting products are then summed to yield a first output. Each output of FFT block 302 is also conjugated by Hermetian transpose circuit 304, and each of the conjugated outputs is supplied to a corresponding input or tap of N-tap FIR filter 308 and multiplied by a corresponding one of the coefficients to yield a second output. The resulting products generated in N-tap FIR filter 308 are summed to yield a second output. The first and second outputs of filters 306 and 308 are then added by adder 312.

The coefficients of N-tap FIR filters 306 and 308 are chosen such that the resulting sum output from adder 312 is representative of CD compensated data in the frequency domain. The differences between the delay and frequency response of the I and Q components associated with such CD compensated data are eliminated or reduced. The output from adder 312 is next supplied to IFFT 314, which converts such data into the time domain.

As data or baud rates increase, the number of bits supplied to circuit 301 also increases. In order to process additional data, FFT 302, FIR filters 306 and 308, as well as IFFT 314 may be provided with additional inputs (e.g., taps) and outputs, as well as additional components (e.g., transistors or gates). These circuits may also be rendered more complex and may be required to consume additional power. An apparatus, method, and system are thus needed for more efficient realization of CD compensation circuitry that operates at higher data rates.

SUMMARY

Consistent with an aspect of the present disclosure, broadly stated, an apparatus is provided comprising a first switch configured to receive first and second groups of bits; a second switch configured to receive third and fourth groups of bits; a first Fourier transform circuit, the first switch being configured to selectively supply the first group of bits to the first Fourier transform circuit, the first Fourier transform circuit being configured to generate first frequency domain data in response to the first groups of bits; a second Fourier transform circuit, the second switch being configured to selectively supply the third group of bits to the second Fourier transform circuit, the second Fourier transform circuit being configured to generate second frequency domain data in response to the third groups of bits; a first Hermetian transpose circuit configured to generate a first conjugate of the first frequency domain data, the first conjugate of the first frequency domain data constituting first conjugate data; a second Hermetian transpose circuit configured to generate a second conjugate of the second frequency domain data, the second conjugate of the second frequency domain data constituting second conjugate data; and a filter circuit configured to receive the first and second conjugate data.

Consistent with another aspect of the present disclosure, broadly stated, a system is provided comprising a plurality of optical transmitters, each of which being configured to supply a corresponding one of a plurality of optical signals, each of the plurality of optical signals having a corresponding one of a plurality of wavelengths; a plurality of receivers, one of which including a plurality of photodiodes, each of which being configured to receive a corresponding portion of one of the plurality of optical signals; and a plurality of analog-to-digital converter (ADC) circuits, each of which being coupled to a corresponding one of the plurality of photodiodes, each of the plurality of ADC circuits being configured to supply a corresponding one of a plurality of digital signals; a first switch configured to receive first and second groups of bits; a second switch configured to receive third and fourth groups of bits, at least one of the first, second, third, and fourth group of bits being indicative of at least one of the plurality of digital signals; a first Fourier transform circuit, the first switch being configured to selectively supply the first group of bits to the first Fourier transform circuit, the first Fourier transform circuit being configured to generate first frequency domain data in response to the first group of bits; a second Fourier transform circuit, the second switch being configured to selectively supply the third group of bits to the second Fourier transform circuit, the second Fourier transform circuit being configured to generate second frequency domain data in response to the third and fourth group of bits; a first Hermetian transpose circuit configured to generate a first conjugate of the first frequency domain data, the first conjugate of the first frequency domain data constituting first conjugate data; a second Hermetian transpose circuit configured to generate a second conjugate of the second frequency domain data, the second conjugate of the second frequency domain data constituting second conjugate data; and a filter circuit configured to receive the first and second conjugate data.

Consistent with another aspect of the present disclosure, broadly stated, a method is provided comprising receiving first and second groups of bits; receiving third and fourth groups of bits; selectively supplying the first group of bits to a first Fourier transform circuit during a time interval; generating first frequency domain data with the first Fourier transform circuit in response to the first group of bits; selectively supplying the third group of bits to a second Fourier transform circuit during the time interval; generating second frequency domain data with the second Fourier transform circuit in response to the third group of bits; generating a first Hermetian conjugate of the first frequency domain data, the first Hermetian conjugate of the first frequency domain data constituting first conjugate data; generating a second Hermetian conjugate of the second frequency domain data, the second Hermetian conjugate of the second frequency domain data constituting second conjugate data; multiplying at least a portion of the first conjugate data by a first coefficient; and multiplying at least a portion of the second conjugate data by a second coefficient.

It is to be understood that both the foregoing general description and the following detailed description are exemplary and explanatory only and are not restrictive of the invention, as claimed.

The accompanying drawings, which are incorporated in and constitute a part of this specification, illustrate exemplary embodiments of the present disclosure and together with the description, serve to explain the principles of the present disclosure.

DESCRIPTION OF THE EMBODIMENTS

According to one aspect of the present disclosure, time domain multiplexing (TDM) is implemented in an efficient manner to reduce the hardware complexity in the implementation of both FFT and IFFT elements for use in circuitry that provide electronic chromatic dispersion (CD) compensation. According to another aspect, an exemplary FFT and IFFT partition methodology is provided for the TDM implementation.

An advantage of the present disclosure is chromatic dispersion compensation may be realized in connection with CD compensation of polarization multiplexed-phase shift keying modulated (PM-QPSK) optical signals, transmitted over a fiber optic medium and detected by a coherent detection receiver. Another advantage provided by at least one aspect of the present disclosure is that CD compensation may be achieved with circuitry that has a relatively simple design and consumes less power.

Reference will now be made in detail to the exemplary embodiments of the present disclosure, examples of which are illustrated in the accompanying drawings. Wherever possible, the same reference numbers will be used throughout the drawings to refer to the same or like parts.

Figure 2:
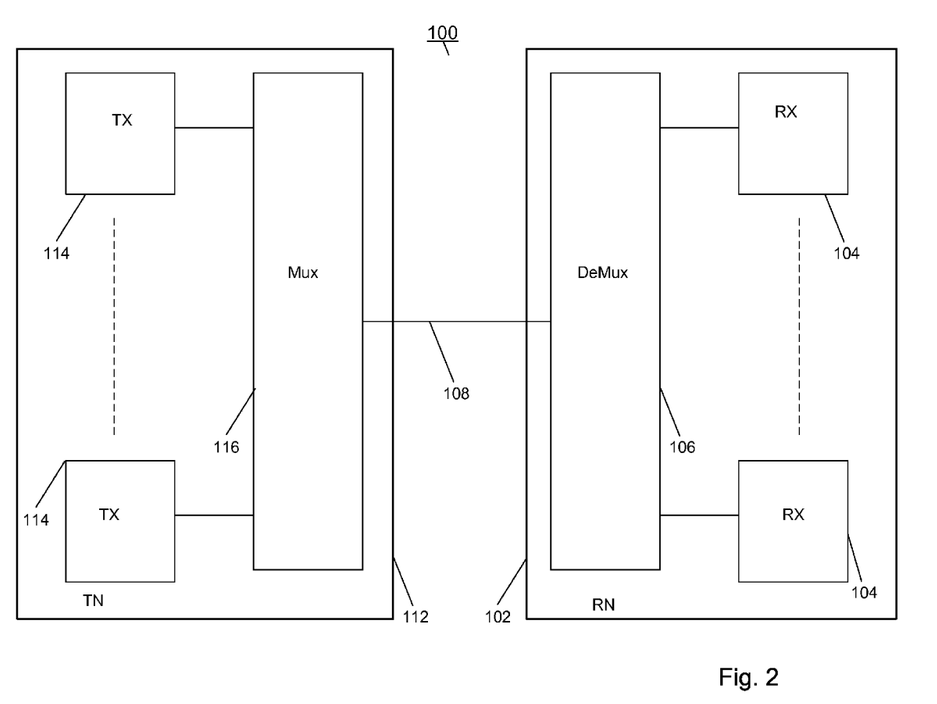
FIG. 2 is a block diagram illustrating a system for transmitting and receiving of optical signals.

FIG. 2 illustrates an exemplary fiber optic communications network system 100 consistent with an aspect of the present disclosure. System 100 includes a Transmit Node (TN) that includes a plurality of optical transmitters (TX) 114, each TX 114 converting an electrical signal to an optical signal having one of a plurality of wavelengths. Each TX 114 is coupled to a Multiplexer (Mux) 116 that combines the optical signals onto an optical fiber medium, identified as line 108 in FIG. 2. The combined optical signals constitute a wavelength division multiplexed (WDM) optical signal that is supplied to a Receive Node (RN), which receives and demultiplexes the WDM optical signal with a demultiplexer (Demux) 106, which supplies each optical signal to each of a corresponding one of a plurality of receivers (RX) 104. Each of receivers 104 may constitute a coherent receiver, as discussed in greater detail below with reference to FIG. 3.

Figure 3:
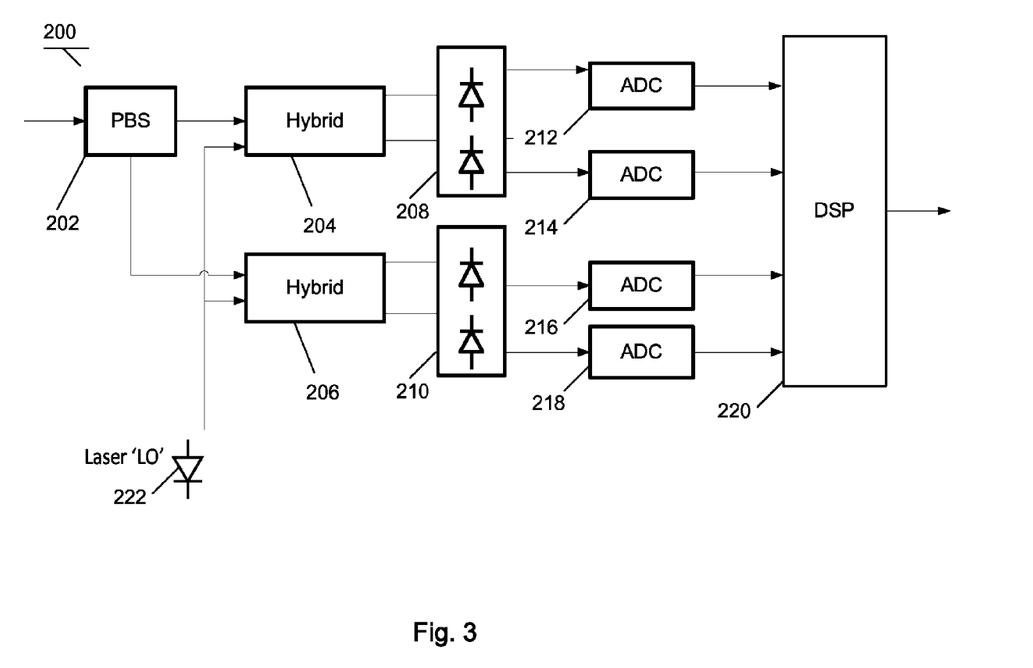
FIG. 3 is a block diagram illustrating a coherent receiver block.

FIG. 3 is a block diagram of a coherent receiver 200 according to an aspect of the present disclosure. The coherent receiver 200 detects not only the amplitude of the optical signal, but also its phase and polarization. In one example, a polarization multiplexed optical signals is supplied to receiver 200. In that case, receiver 200 may include a polarization beam splitter (PBS) 202 operable to receive the input optical signal and to separate the signal into orthogonal polarizations, also referred to as X and Y polarizations; i.e., vector components of the optical E-field. The orthogonal polarizations are then mixed with a laser local oscillator (LO) 222 reference through hybrids 204, 206. The Hybrids 204, 206 each outputs two signals, the four signals representing the in-phase and quadrature components of the optical E-field on X and Y polarizations. The composite signals at the output of the hybrids 204, 206 are made incident on respective photodiodes in a set of photodetectors 208, 210, to generate four analog electrical output signals.

The four output signals from the photodiodes in photodetectors 208, 210 comprise four base-band analog electrical signals linearly proportional to the in-phase and quadrature components of the optical E-field on X and Y polarizations. The analog signals are then sampled at a symbol rate by respective analog-to-digital converter (ADC) circuits 212, 214, 216, 218, each coupled to a corresponding one of the photodiodes of photodiode pair 208. Each of the ADC circuits 212, 214, 216, 218 is configurable to supply a corresponding one of a plurality of digital signals to a Digital Signal Processor (DSP) 220.

Figure 4:
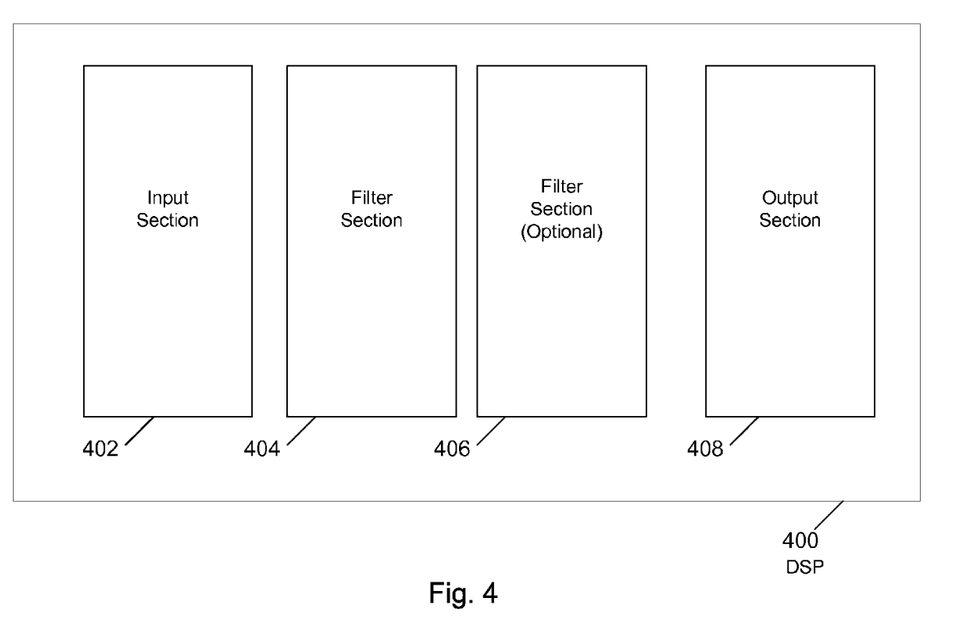
FIG. 4 is a block diagram illustrating an exemplary DSP and sections thereof, according to an embodiment of the present disclosure.

FIG. 4 is a high level block diagram illustrating an exemplary architecture for a DSP 400 according to an embodiment of the present disclosure. The DSP 400 includes an input section 402, a filter section 404, an optional filter section 404, and an output section 408. Embodiments for the sections in FIG. 4 will be described in further detail below.

Figure 5A:
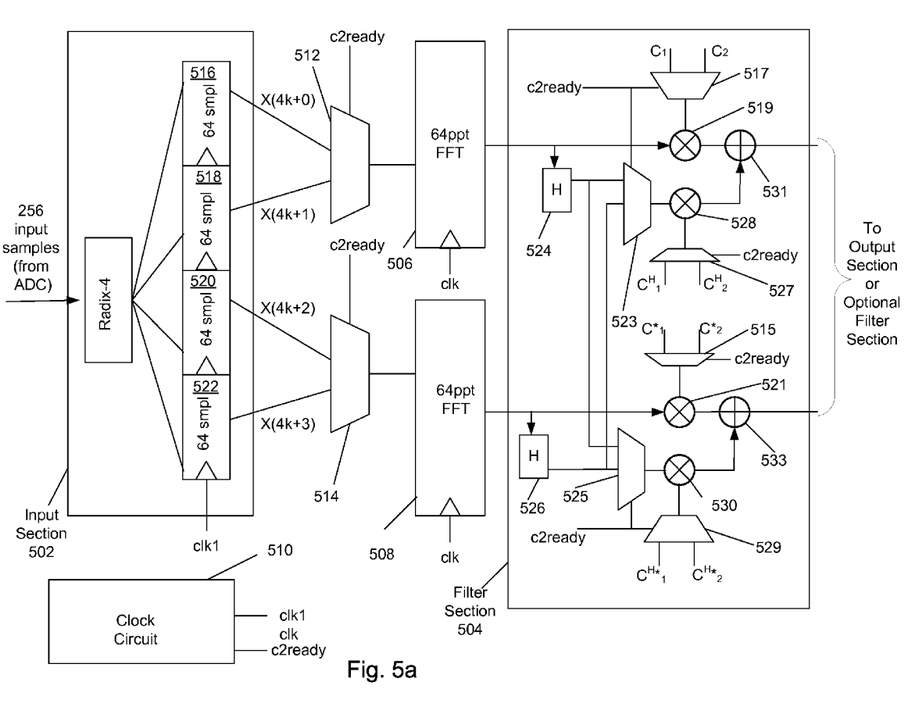
FIG. 5a is a diagram illustrating preferred embodiments corresponding to the input section and filter sections of the DSP in FIG. 4, along with the preferred elements for coupling and configuring those sections.

FIG. 5a is a diagram illustrating preferred embodiments of input section and filter sections of DSP 400 in FIG. 4, along with the preferred elements coupling and configuring those sections. The Input section 502 in FIG. 5a is a preferred embodiment of the input section 402 in FIG. 4. Filter section 504 in FIG. 5a is a preferred embodiment of the filter section 404 in FIG. 4. According to an alternative embodiment, the output of the filter section 504 is provided to the output section 408 in FIG. 4 or, alternatively, to an optional filter section 406 in FIG. 4.

The input section 502 receives 256 input samples or groups of bits from ADC 212, 214, 216, and 218 in FIG. 3.

Input section 502 may include a Radix-4 block coupled to four memories 516, 518, 520, and 522. The Radix-4 block separates the samples into four groups. The four respective memories 516, 518, 520, 522 are each configured to store respective first, second, third, and fourth group of bits received from the Radix-4 block. Each of memories 516, 518, 520, and 522 may include a buffer, for example, or other known memory circuit. Each of the plurality of ADC circuits 212, 214, 216, and 218 is configured to supply a corresponding one of a plurality of digital signals, at least one of the first, second, third, and fourth groups of bits being indicative of at least one of the plurality of digital signals. The first, second, third and fourth groups of bits are indicative of an amount of chromatic dispersion in the optical signal.

A first switch circuit or switch 512 is coupled between memories 516 and 518 and a Fourier transform circuit 506. A second switch 514 is coupled between memories 520 and 522 and a Fourier transform circuit 508. The first and second switches 512, 514 are configurable to supply groups of bits to respective Fourier transform circuits 506, 508 during different time intervals. Each Fourier transform circuit 506, 508 preferably includes a respective 64 ppt FFT as shown in the example in FIG. 5a. In describing the example in FIG. 5a, each Fourier transform circuit 506, 508 may also be referred to herein as 64 ppt FFT 506, 508; however, this is not meant to limit the Fourier transform circuits 506, 508 to include FFTs.

In the example in FIG. 5a, each of the memories 516, 518, 520, 522 is configured to store 64 samples. A Radix-4 256 point FFT has 4×64=256 input data samples. Thus, two groups of bits are provided to each 64 ppt FFT 506, 508 in the example in FIG. 5a, so as to provide the 256 point FFT. For the Radix 4 implementation, the outputs of the 256 point FFT may be partitioned into four groups, each with a corresponding of 4k+0, 4k+1, 4k+2 or 4k+3, where k=0~63. The first memory 516 and second memory 518 are further configured to supply the first group of bits, identified as X(4K+0) and the second group of bits, identified as X(4K+1), to the first switch 512. Similarly, the third memory 520 and fourth memory 522 are configured to supply the third group of bits, identified as X(4K+2) and the fourth group of bits, identified as X(4K+3), to the second switch 514.

Each of the 64 ppt FFT 506, 508 is configured to generate respective frequency domain data in response to a supplied group of bits. The filter section 504 includes a Hermetian transpose circuit 524 coupled to 64 ppt FFT 506 and a Hermetian transpose circuit 526 coupled to 64 ppt FFT 508. Each Hermetian transpose circuit 524, 526 is configured to generate a conjugate of the respective frequency domain data. The conjugates generated by the Hermetian transpose circuits 524 and 526 constituting respective conjugate data.

For the example in FIG. 5a, there is a 256 point FFT decimated in frequency using Radix 4 butterfly structures. The example in FIG. 5a assumes a time division multiplexing 2 (TDM2) implementation, i.e., completes a full 256 point FFT every 2 cycles of main clock signal clk, i.e., every cycle of signal c2ready.

Generally, with a 256 point FFT, the Hermitian conjugate is defined in the following as $X^H$ with X being the FFT output and * for complex conjugate.

$$X=[X_0, X_1, X_2, X_3, X_4, X_5, X_6, X_7, X_8, X_{10}, X_{11}, \ldots, X_{252}, X_{253}, X_{254}, X_{255}]$$

$$X^H=[X^*_0, X^*_{255}, X^*_{254}, X^*_{253}, X^*_{252}, X^*_{251}, X^*_{250}, X^*_{249}, X^*_{248}, X^*_{247}, X^*_{246}, \ldots, X^*_4, X^*_3, X^*_2, X^*_1]$$

The outputs of a Radix 4 256 point implementation may be partitioned into four groups, each with its index of 4k+0, 4k+1, 4k+2 or 4k+3, where k=0~63, as noted above. This is shown as:

$$X = \begin{matrix} [X_0, X_4, X_8, \ldots, X_{248}, X_{252},] & [X_1, X_5, \ldots, X_{249}, X_{253},] \\ X(4k+0) & X(4k+1) \\ [X_2, X_6, \ldots, X_{250}, X_{254},] & [X_3, X_7, \ldots, X_{251}, X_{255},] \\ X(4k+2) & X(4k+3) \end{matrix}$$

In one example of a TDM2 implementation, the conjugates of X(4k+0) and X(4k+1) are generated during a first clock cycle and X(4k+2) and X(4k+3) are generated during a second clock cycle. Typically, the Hermitian must operate on X(4k+0) and X(4K+2) to generate the first two partitions $[X^*_0, X^*_{252}, X^*_{248}, \ldots, X^*_8, X^*_4]$ and $[X^*_{255}, X^*_{251}, \ldots, X^*_7, X^*_3]$. X(4k+2), however, is not available until the second clock cycle. Thus, additional memory may be required to store X(4k+1) until X(4k+2) is available, thereby requiring additional circuit complexity.

On the other hand, X(4k+0) and X(4k+2) may be generated during the first clock cycle while X(4k+1) and X(4k+3) may be generated during the second clock. Thus, X(4k+0) and X(4k+2) are available to be operated on by the Hermetian during the same clock cycle and the implementation of the CD equalization in a TDM fashion has far less complexity and is much more efficient in hardware. In this case, the Hermitian conjugate can be partitioned accordingly as follows.

$$X=[X_0, X_4, X_8, \ldots, X_{248}, X_{252}] [X_1, X_5, \ldots, X_{249}, X_{253}] [X_2, X_6, \ldots, X_{250}, X_{254}] [X_3, X_7, \ldots, X_{251}, X_{255}]$$

$$X^H=[X^*_0, X^*_{252}, X^*_{248}, \ldots, X^*_8, X^*_4] [X^*_{255}, X^*_{251}, \ldots, X^*_7, X^*_3] [X^*_{254}, X^*_{250}, \ldots, X^*_6, X^*_2] [X^*_{253}, X^*_{249}, \ldots, X^*_5, X^*_1]$$

Thus, by generating X(4k+0) and X(4k+2) at the $1^{st}$ clock cycle, $X^H(4k+0)$ and $X^H(4k+2)$ can be obtained by a Hermitian transpose circuit, from X(4k+0) and X(4k+2), respectively, during the first clock cycle. As a result, X(4k+0), X(4k+2), $X^H(4k+0)$, and $X^H(4k+2)$ are each available during the first clock cycle, and, therefore, filter section 504 may generate CD compensated data during the first clock cycle. During the second clock cycle, X(4k+1) and X(4k+3) are generated, and, $X^H(4k+1)$ $X(4^k+3)$ can be calculated. As a result, there X(4k+1), X(4k+3), $X^H(4k+1)$ and $X^H(4k+3)$ are available, such that further CD compensated data can be calculated during the second clock cycle.

Thus, the advantage of generating outputs X(4k+0) and X(4k+2) at the $1^{st}$ clock cycle while generating the X(4k+1) and X(4k+3) at the $2^{nd}$ cycle, according to this preferred embodiments, is that a 256 point filter can be built in TDM fashion, using only about half the hardware that would otherwise be required. That is, with the TDM implementation noted above, half as much hardware may be required as opposed to an implementation in which X(4k+0) and X(4k+1) are generated during the first clock cycle and X(4k+2) and X(4k+3) are generated during the second clock cycle.

Figure 5B:
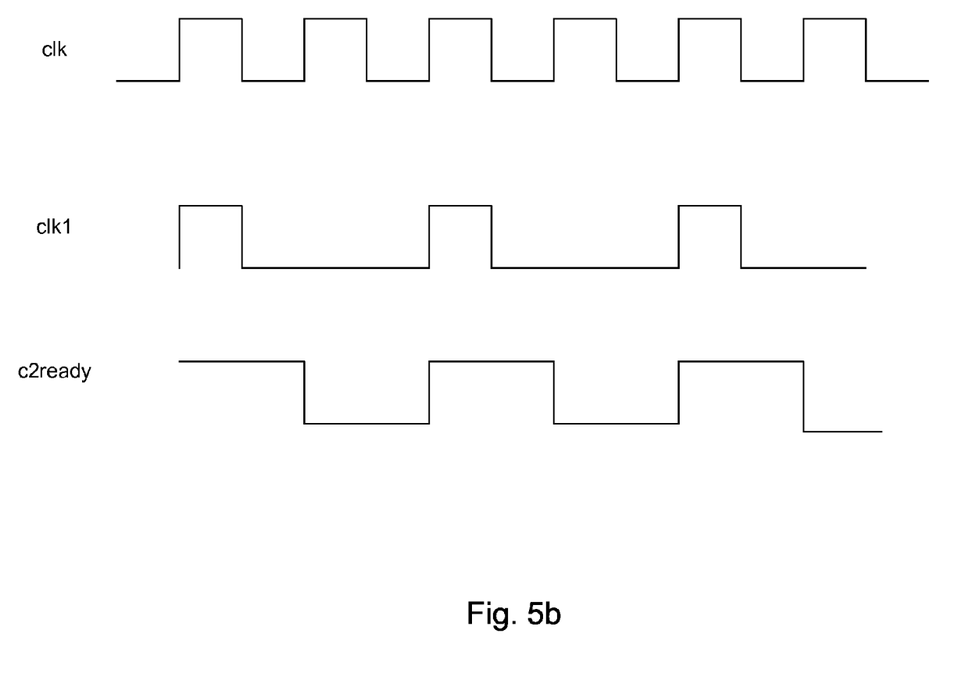
FIG. 5b is a timing diagram showing exemplary timing for the clock signals generated by the clock circuit.

In the example shown in FIG. 5a, a clock circuit 510 is included for generating signals clk1, clk, and c2ready. FIG. 5b is a timing diagram showing exemplary timing for the clock signals generated by clock circuit 510. As can be seen, signal c2ready has a first time interval corresponding to a first cycle of the main clock signal clk and a second time interval corresponding to a second cycle of the main clock signal clk. Signal clk1 has half the frequency of main clock signal clk.

Thus, as shown in FIG. 5b, the signal c2ready toggles every 2 clock cycles of the main clock signal clk. In operation, for c2ready=0, X(4k+0) and X(4k+2) (groups of bits) are selectively supplied by respective switches 512 and 514 to the respective two 64 ppt FFTs 506, 508. The outputs (frequency domain data) from the each respective 64 ppt FFTs 506, 508 are coupled through respective Hermitian transpose circuit "H" blocks 524 and 526, which circuits are configured to generate conjugate data of the frequency domain data. The conjugate data is then selected by switch 523 in response to clock c2ready, and the selected conjugate data is multiplied by multiplier 528 by one of coefficients $C^H_1$ and $C^H_2$, as selected by switch 527 in response to clock c2ready. In addition, conjugate data is selected by switch 525 further in response to clock c2ready, and the selected conjugate data is multiplied by multiplier 530 by one of coefficients $C^{H*}_1$ and $C^{H*}_2$, as selected by switch 527 in response to clock c2ready. In addition, as further shown in FIG. 5a, the frequency domain data is supplied directly to multiplier 519, which multiplies such frequency domain data by one of coefficients $C_1$ and $C_2$ selectively supplied by switch 517 in response to c2ready. Also, frequency domain data is supplied to multiplier 521, which multiplies the frequency domain data by one of coefficients $C*_1$ and $C*_2$ selectively supplied by switch 515 in response to c2ready. The outputs of multipliers 519 and 521 are added or summed by adders 531 and 533, respectively, with the corresponding outputs of multipliers 528 and 530. The outputs of adders 531 and 533, in turn, which represent CD compensated frequency domain data, may next be supplied to output section 408 or an additional filter section 406. Thus, the first, second, third and fourth groups of bits respectively output from memories 516, 518, 520, and 522 are indicative of an amount of chromatic dispersion in an optical signal, and an output of the filter section is not indicative of the amount of the chromatic dispersion.

For signal c2ready=1, X(4k+1) and X(4k+3) (groups of bits) are selectively supplied to the 64 ppt FFTs 506, 508 by respective switches 512, 514. The output of 64 ppt FFTs 506, 508 are correspondingly filtered using the filter coefficients of $C_2$'s and $C^H_2$'s in a manner similar to that discussed above.

Figure 7:
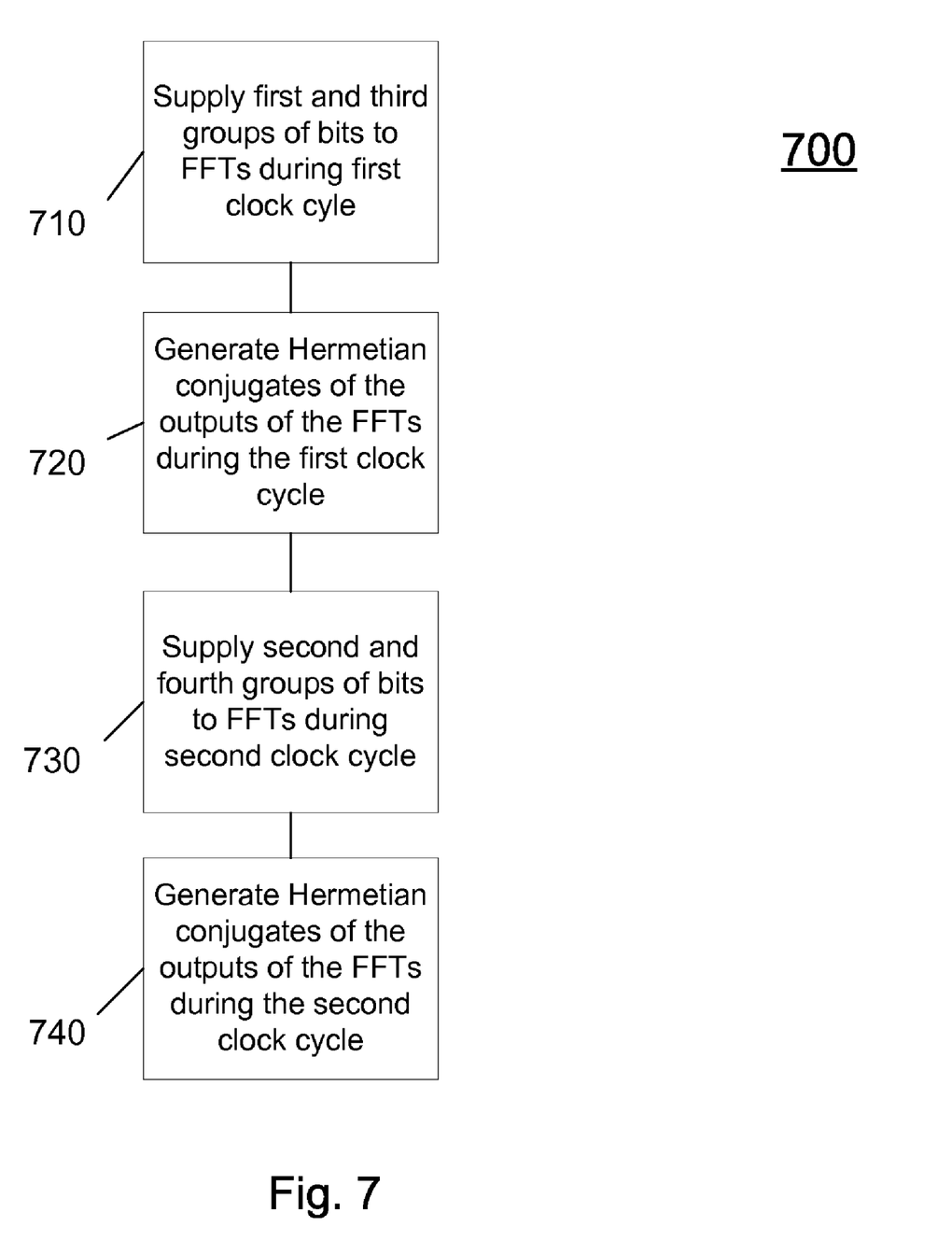
FIG. 7 is a diagram further illustrating exemplary steps of aspects of the preferred time division multiplex process.

FIG. 7 is a diagram further illustrating exemplary steps of aspects of the preferred time division multiplex process. At Step 710, the first and third group of bits are supplied to FFTs 512 and 514, respectively, during a first clock cycle, e.g., X(4k+0) and X(4K+2) bits shown in FIG. 5a during a first cycle of signal c2ready. At Step 720, Hermetian conjugates of the outputs of the FFTs are generated during the first clock cycle of signal c2ready. Step 730 includes supplying the second and fourth group of bits are supplied to FFTs 512 and 514, respectively, during a second clock cycle, e.g., X(4k+1) and X(4K+3) shown in FIG. 5a. At Step 740, Hermetian conjugates of the outputs of the FFTs 512 and 514 are generated during the second clock cycle of signal c2ready.

The addition of time division multiplexing according to the preferred TDM embodiment reduces the size of the Hermetian (H) blocks by a factor of 2; and reduces the number of required multipliers and adders by a factor of 2. The cost for the TDM implementation is the use of the TDM multiplexers, which is relatively small as compared to the multipliers and adders.

Alternatively, the above described preferred embodiment can be extended to other TDM implementations, such as TDM 4, in which case a complete FFT and CD equalization can be performed every 4 clock cycles.

Figure 6:
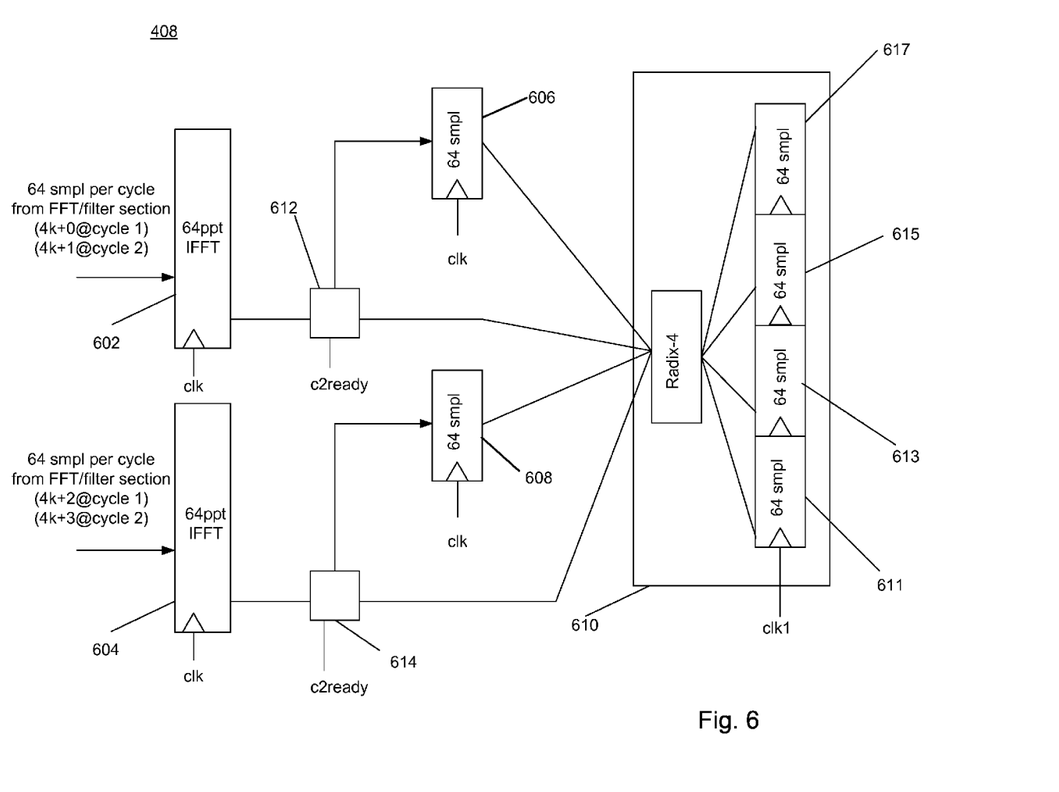
FIG. 6 illustrates an exemplary embodiment of an output section which is a preferred embodiment of the output section in FIG. 4.

According to an alternate embodiment, the frequency domain output of the filter section 404 in FIG. 4 is provided to an output section 408. FIG. 6 illustrates an exemplary embodiment of an output section 600 which is a preferred embodiment of the output section 408 in FIG. 4. According to the alternate embodiment, the output section 600 receives frequency domain TDM data from the filter section 504 in FIG. 5a, i.e., receiving X(4k+0) and X(4k+2), in one clock cycle of signal c2ready while receiving X(4k+1) and X(4k+3) in the other cycle of signal c2ready. Thus, the output section 600 preferably works with the filter section 504 using decimation in time.

In the example shown in FIG. 6, a 256 point IFFT includes two inverse-Fourier transform circuits 602, 604. Preferably, each of inverse-Fourier transform circuits 602 and 604 includes Inverse fast Fourier transform (IFFT) circuits. As shown in FIG. 6, the inverse-Fourier transform circuit 602 receives 64 samples (smpl) in the first cycle of clock signal clk (4k+0@cycle 1) and an additional 64 samples (4k+1@cycle 2) during the second cycle of clock signal clk, both groups of sample or bits may be provided from filter section 504. Inverse-Fourier transform circuit 604 receives 64 samples (smpl) or groups of bits from filter section 504 (smpl) (4k+2@cycle 1) in the first cycle of clock signal clk and receives 64 samples or groups of bits (smpl) from filter section 504 during the second cycle of clock signal clk (4k+3@cycle 2). Thus, the filter section provides first (4k+0) and second (4k+2) filtered data during the first time interval, i.e., cycle 1, and third (4k+1) and fourth (4k+3) filtered data during the second time interval, i.e., cycle 2. In other words, the 256 point IFFT formed by inverse-Fourier transform circuits 602, 604 receives input data in a TDM fashion.

The clock circuit 510 is configured for generating signals clk1, clk, and c2ready, as shown in the timing diagram in FIG. 5b. As can be seen, signal c2ready has a first time interval corresponding to a first cycle of the main clock signal clk and a second time interval corresponding to a second cycle of the main clock signal clk. The first time interval corresponding to a first cycle of the clock signal and the second time interval corresponding to a second cycle of the clock signal.

The inverse-Fourier transform circuit 602 is configured to output first time domain data in response to the first filtered data during a first time interval. The inverse-Fourier transform circuit 604 is configured to output second time domain data in response to the second filtered data during the first time interval. The inverse-Fourier transform circuit 604 is further configured to output third time domain data in response to the third filtered data during the second time interval. The inverse-Fourier transform circuit 604 is further configured to output fourth time domain data in response to the fourth filtered data during the second time interval.

In the example in FIG. 6, a first switch 612 is coupled between inverse-Fourier transform circuit 602 and both a memory 606 and a block 610. The signal c2ready is supplied to switch 612, which toggles every 2 clock cycles of the main clock signal clk (see FIG. 5a and timing shown in FIG. 5b). The memory 606 (which may include a buffer) is configured to store the first time domain data and the memory 608 is configured to store the third time domain data. Output section 600 further includes a second filter circuit that generates output data in response to the first and third time domain data.

A second switch 614 is coupled between inverse-Fourier transform circuit 604 and both a memory 606 and a block 610. The first and second switches 612, 614 are configurable to supply output time domain data from respective inverse-Fourier transform circuits 602, 604 to respective memories 606, 608 and block 610.

In operation, under control of clock clk, IFFT 602 outputs first time domain data to switch 612 and IFFT 604 supplies second time domain data to switch 614 in response to outputs from filter section 504, for example. Under control of signal c2ready, switch 612 may supply the first time domain data to memory 606 and switch 614 may supply the second time domain data to memory 608. In the next cycle of clock signal clk, which may be aligned with signal c2ready, third time domain data is supplied directly to the Radix-4 circuit of block 610, via switch 612, and fourth time domain data is supplied directly to the Radix-4 circuitry of block 610 via switch 614. In addition, memories 606 and 608 are controlled by clock signal clk to supply the contents thereof (first and second time domain data, respectively) to the Radix-4 circuitry, which may process the data in a known manner and supply the data, partitioned into four portions, groups or sub-groups, to a respective one of memories 611, 613, 615, and 617. Memories or buffers 611, 613, 615, and 617 are controlled by clock signal clk1 to output the data stored therein in time domain format. In this example, the time domain data includes 256 samples or groups of bits every two clock cycles of c2ready. Thus, as noted above, time domain data supplied to input section 402 is converted to frequency domain data, filtered, and converted back to time domain data and, in doing so, CD compensation takes place.

Moreover, as further noted above, a time division multiplexed (TDM) implementation is described for performing CD compensation with Hermetian conjugates. The TDM implementation has a simpler design, requires fewer components, and consumes less power than corresponding conventional designs, which may require a larger number of components and consume more power, especially at higher data rates (e.g., 40 Gbit/second or 100 Gbit/second).

Other embodiments will be apparent to those skilled in the art from consideration of the specification. It is intended that the specification and examples be considered as exemplary only, with a true scope and spirit of the invention being indicated by the following claims.

What is claimed is:

1. An apparatus, comprising:
a first switch configured to receive first and second groups of bits;
a second switch configured to receive third and fourth groups of bits;
a first Fourier transform circuit, the first switch being configured to selectively supply the first group of bits to the first Fourier transform circuit, the first Fourier transform circuit being configured to generate first frequency domain data in response to the first groups of bits;
a second Fourier transform circuit, the second switch being configured to selectively supply the third group of bits to the second Fourier transform circuit, the second Fourier transform circuit being configured to generate second frequency domain data in response to the third groups of bits;
a first Hermetian transpose circuit configured to generate a first conjugate of the first frequency domain data, the first conjugate of the first frequency domain data constituting first conjugate data;
a second Hermetian transpose circuit configured to generate a second conjugate of the second frequency domain data, the second conjugate of the second frequency domain data constituting second conjugate data; and
a filter circuit configured to receive the first and second conjugate data.

2. An apparatus in accordance with claim 1, wherein the filter circuit includes a multiplier circuit configured to multiply the first and second conjugate data by first and second coefficients, respectively.

3. An apparatus in accordance with claim 2, wherein an output of the filter circuit is equalized relative to the first, second, third, and fourth groups of bits.

4. An apparatus in accordance with claim 1, wherein each of the first and second Fourier transform circuits includes a fast Fourier transform circuit.

5. An apparatus in accordance with claim 1, further including first, second, third, and fourth memories configured to store the first, second, third, and fourth groups of bits, respectively, the first and second memories being configured to supply the first and second groups of bits, respectively, to the first switch, and the third and fourth memories being configured to supply the third and fourth groups of bits, respectively, to the second switch.

6. An apparatus in accordance with claim 1, wherein the first, second, third and fourth groups of bits are indicative of an amount of chromatic dispersion in an optical signal, and an output of the filter circuit is not indicative of the amount of the chromatic dispersion.

7. An apparatus in accordance with claim 1, wherein the first switch supplies the first group of bits to the first Fourier transform circuit during a first time interval and the second switch supplies the third group of bits to the second Fourier transform circuit during the first time interval, and the first switch supplies the second group of bits to the first Fourier transform circuit during a second time interval and the second switch supplies the fourth group of bits to the second Fourier transform circuit during the second time interval.

8. An apparatus in accordance with claim 7, wherein the filter circuit provides first and second filtered data during the first time interval and third and fourth filtered data during the second time interval, the apparatus further including:
a first inverse-Fourier transform circuit configured to output first time domain data in response to the first filtered data during the first time interval; and
a second inverse-Fourier transform circuit configured to output second time domain data in response to the second filtered data during the first time interval,
wherein the first inverse-Fourier transform circuit is further configured to output third time domain data in response to the third filtered data during the second time interval, and the second inverse-Fourier transform circuit is further configured to output fourth time domain data in response to the fourth filtered data during the second time interval.

9. An apparatus in accordance with claim 8, further including first, second, third, and fourth memories, each of which being configured to store the first, second, third, fourth groups of bits, respectively, the first and second memories being configured to supply the first and second groups of bits, respectively, to the first switch, and the third and fourth memories are configured to supply the third and fourth groups of bits, respectively, to the second switch.

10. An apparatus in accordance with claim 9, further including a fifth and sixth memories, the fifth memory being configured to store the first time domain data and the sixth memory being configured to store the third time domain data.

11. An apparatus in accordance with claim 8, wherein the filter circuit is a first filter circuit, the apparatus further including a second filter circuit that generates output data in response to the first and third filtered data.

12. An apparatus in accordance with claim 7, further including a clock circuit that generates a clock signal, the first time interval corresponding to a first cycle of the clock signal and the second time interval corresponding to a second cycle of the clock signal.

13. An apparatus in accordance with claim 1, further including
a plurality of photodiodes, each of which being configured to receive a corresponding one of a plurality of optical signals; and
a plurality of analog-to-digital converter (ADC) circuits, each of which being coupled to a corresponding one of the plurality of photodiodes, each of the plurality of ADC circuits being configured to supply a corresponding one of a plurality of digital signals, at least one of the first, second, third, and fourth groups of bits being indicative of at least one of the plurality of digital signals.

14. An apparatus in accordance with claim 13, further including a local oscillator laser, wherein at least one of the plurality of optical signals includes light supplied from the local oscillator laser.

15. A system, comprising:
a plurality of optical transmitters, each of which being configured to supply a corresponding one of a plurality of optical signals, each of the plurality of optical signals having a corresponding one of a plurality of wavelengths;
a plurality of receivers, one of which including:
a plurality of photodiodes, each of which being configured to receive a corresponding portion of one of the plurality of optical signals; and
a plurality of analog-to-digital converter (ADC) circuits, each of which being coupled to a corresponding one of the plurality of photodiodes, each of the plurality of ADC circuits being configured to supply a corresponding one of a plurality of digital signals;
a first switch configured to receive first and second groups of bits;
a second switch configured to receive third and fourth groups of bits, at least one of the first, second, third, and fourth group of bits being indicative of at least one of the plurality of digital signals;
a first Fourier transform circuit, the first switch being configured to selectively supply the first group of bits to the first Fourier transform circuit, the first Fourier transform circuit being configured to generate first frequency domain data in response to the first group of bits;
a second Fourier transform circuit, the second switch being configured to selectively supply the third group of bits to the second Fourier transform circuit, the second Fourier transform circuit being configured to generate second frequency domain data in response to the third and fourth group of bits;
a first Hermetian transpose circuit configured to generate a first conjugate of the first frequency domain data, the first conjugate of the first frequency domain data constituting first conjugate data;
a second Hermetian transpose circuit configured to generate a second conjugate of the second frequency domain data, the second conjugate of the second frequency domain data constituting second conjugate data; and
a filter circuit configured to receive the first and second conjugate data.

16. A system in accordance with claim 15, wherein the filter circuit includes a multiplier circuit configured to multiply the first and second conjugate data by first and second coefficients, respectively.

17. A system in accordance with claim 16, wherein an output of the filter circuit is equalized relative to the first, second, third, and fourth groups of bits.

18. A system in accordance with claim 15, wherein each of the first and second Fourier transform circuits includes a fast Fourier transform circuit.

19. A system in accordance with claim 15, further including first, second, third, and fourth memories configured to store the first, second, third, and fourth groups of bits, respectively, the first and second memories being configured to supply the first and second groups of bits, respectively to the first switch, and the third and fourth memories being configured to supply the third and fourth groups of bits, respectively, to the second switch.

20. A system in accordance with claim 15, wherein the first, second, third and fourth groups of bits are indicative of an amount of chromatic dispersion in an optical signal, and an output of the filter circuit is not indicative of the amount of the chromatic dispersion.

21. A system in accordance with claim 15, wherein the first switch supplies the first group of bits to the first Fourier transform circuit during a first time interval and the second switch supplies the third group of bits to the second Fourier transform circuit during the first time interval, and the first switch supplies the second group of bits to the first Fourier transform circuit during a second time interval and the second switch supplies the fourth group of bits to the second Fourier transform circuit during the second time interval.

22. A system in accordance with claim 21, wherein the filter circuit provides first and second filtered data during the first time interval and third and fourth filtered data during the second time interval, the apparatus further including:
a first inverse-Fourier transform circuit configured to output first time domain data in response to the first filtered data during the first time interval; and
a second inverse-Fourier transform circuit configured to output second time domain data in response to the second filtered data during the first time interval,
wherein the first inverse-Fourier transform circuit is further configured to output third time domain data in response to the third filtered data during the second time interval, and the second inverse-Fourier transform circuit is further configured to output fourth time domain data in response to the fourth filtered data during the second time interval.

23. A system in accordance with claim 22, further including first, second, third, and fourth memories, each of which being configured to store the first, second, third, fourth groups of bits, respectively, the first and second memories being configured to supply the first and second groups of bits, respectively, to the first switch, and the third and fourth memories are configured to supply the third and fourth groups of bits, respectively, to the second switch.

24. A system in accordance with claim 23, further including a fifth and sixth memories, the fifth memory being configured to store the first time domain data and the sixth memory being configured to store the third time domain data.

25. A system in accordance with claim 23, wherein the filter circuit is a first filter circuit, the apparatus further including a second filter circuit that generates output data in response to the first and third time filtered data.

26. A system in accordance with claim 21, further including a clock circuit that generates a clock signal, the first time interval corresponding to a first cycle of the clock signal and the second time interval corresponding to a second cycle of the clock signal.

27. A system in accordance with claim 15, wherein said one of the plurality of receivers further includes a local oscillator laser, wherein each of the plurality of photodiodes further receives at least a portion of light supplied from the local oscillator laser.

28. A method, comprising:
   receiving first and second groups of bits;
   receiving third and fourth groups of bits;
   selectively supplying the first group of bits to a first Fourier transform circuit during a time interval;
   generating first frequency domain data with the first Fourier transform circuit in response to the first group of bits;
   selectively supplying the third group of bits to a second Fourier transform circuit during the time interval;
   generating second frequency domain data with the second Fourier transform circuit in response to the third group of bits;
   generating a first Hermetian conjugate of the first frequency domain data, the first Hermetian conjugate of the first frequency domain data constituting first conjugate data;
   generating a second Hermetian conjugate of the second frequency domain data, the second Hermetian conjugate of the second frequency domain data constituting second conjugate data;
   multiplying at least a portion of the first conjugate data by a first coefficient; and
   multiplying at least a portion of the second conjugate data by a second coefficient.

29. A method in accordance with claim 28, wherein the time interval is a first time interval, the method further comprising:
   selectively supplying the second group of bits to the first Fourier transform circuit during a second time interval;
   generating third frequency domain data with the first Fourier transform circuit in response to the second group of bits;
   selectively supplying the fourth group of bits to the second Fourier transform circuit during the second time interval;
   generating fourth frequency domain data with the second Fourier transform circuit in response to the fourth group of bits;
   generating a third Hermetian conjugate of the third frequency domain data, the third Hermetian conjugate of the third frequency domain data constituting third conjugate data;
   generating a fourth Hermetian conjugate of the fourth frequency domain data, the fourth Hermetian conjugate of the fourth frequency domain data constituting fourth conjugate data;
   multiplying at least a portion of the third conjugate data by a third coefficient; and
   multiplying at least a portion of the fourth conjugate data by a fourth coefficient.

* * * * *